Patented Mar. 25, 1924.

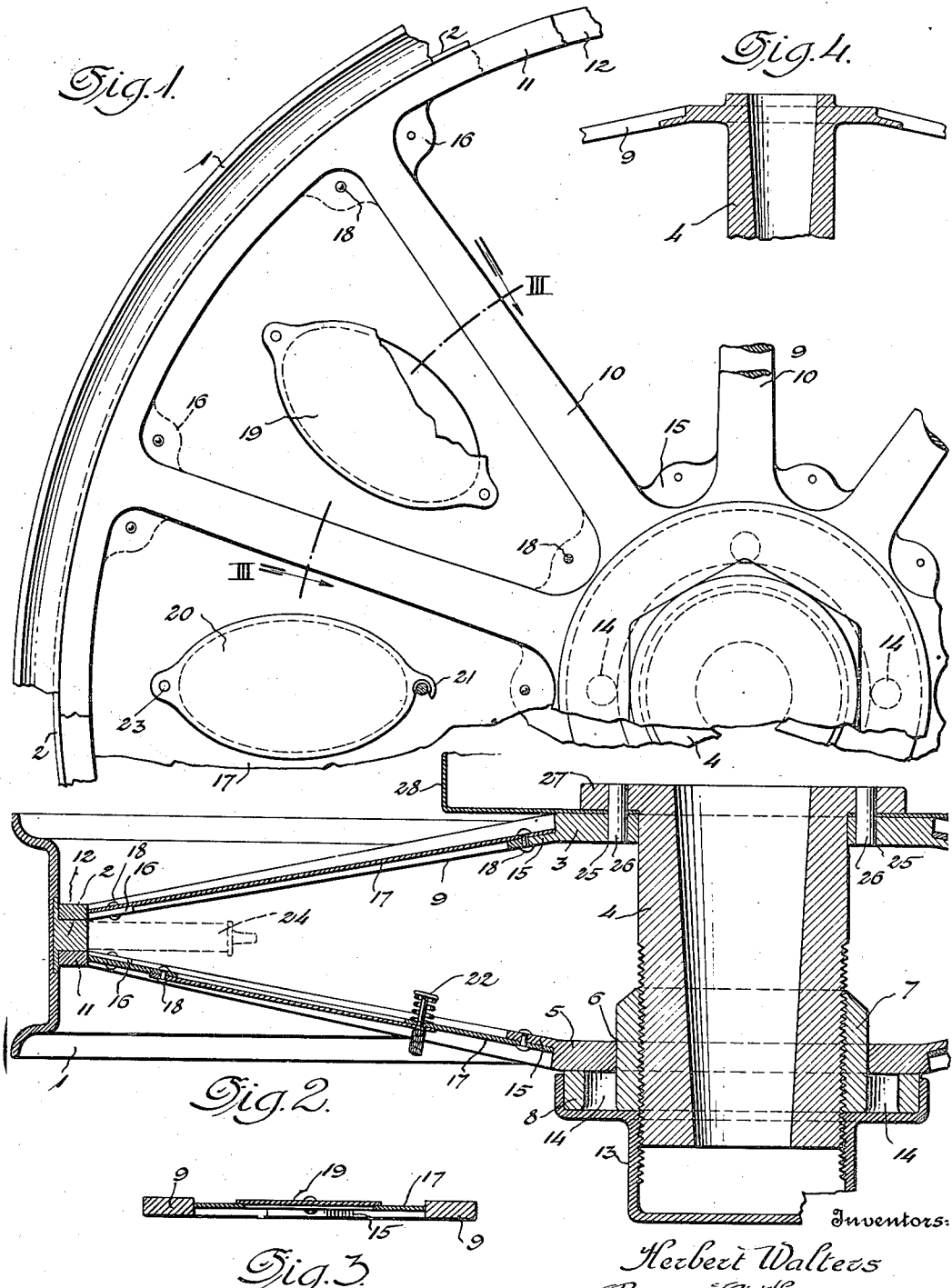

1,487,904

UNITED STATES PATENT OFFICE.

HERBERT WALTERS AND ROMAN A. HOERMAN, OF DETROIT, MICHIGAN.

WHEEL.

Application filed May 10, 1923. Serial No. 637,953.

*To all whom it may concern:*

Be it known that we, HERBERT WALTERS and ROMAN A. HOERMAN, citizens of the United States of America, residing at Detroit, in the county of Wayne and State of Michigan, have invented certain new and useful Improvements in Wheels, of which the following is a specification, reference being had therein to the accompanying drawings.

This invention relates to a wheel construction and has for its principal object the provision of a simple, strong and durable device which is capable of being easily taken apart when it is desired to remove the tire.

A further object of the invention is to provide a wheel which shall have the appearance of solidity produced by disc wheels, while at the same time permitting many variations in design.

Other and further objects of the invention will appear in connection with the description, reference being had to the accompanying drawing forming part of this specification, in which—

Figure 1 is a fragmentary elevation of a wheel showing one embodiment of the invention;

Fig. 2 is an axial section;

Fig. 3 is a section taken on the line III—III of Fig. 1; and

Fig. 4 is a fragmentary section of a modification.

A rim 1 which may be of any well known or preferred construction is provided with an annular channel within its inner periphery to receive a flanged annular rib member 2, the central portion of which projects inward for engagement with the outer peripheries of the two central members of the wheel. One of these central members designated by the numeral 3 is provided with a central opening to receive a hub 4 and the other of the central members designated by the numeral 5 is provided with an opening 6 of a size to receive a sleeve portion 7 of a clamping nut 8 having screwthreaded engagement with the hub 4. From the central portions of the members 3 and 5, spokes 9 and 10 extend outward radially to circular clamping rings 11 and 12, preferably formed integral with the spokes as by casting.

It will be seen that with the hub 4 held in position upon the end of an axle (not shown), the rim 1 may be placed in position, with the rib 2 in contact with the ring 12 carried by the spokes 9. The member 5 will then be set in place with the ring 11 carried by the spokes 10 in contact with the side of the rib 2 opposite to that engaging the ring 12 and the nut 8 will then be screwed in place upon the hub 4, the sleeve 7 providing a sufficient amount of contact with the threads to obviate stripping. After the nut 8 has been forced upon the hub 4 to a point at which the members 3 and 5 are clamped rigidly in position, the hub cap 13 will be screwed into place, acting as a clamp nut to prevent loosening of the nut 8. Holes 14 within the nut 8 are adapted for engagement with a spanner wrench. Within the spaces between the spokes 9 and also between the spokes 10, webs 15, 16 are provided to receive sheet metal plates 17 which may be held in place by rivets 18. Upon these plates 17 may be secured or formed ornaments 19 of any desired configuration, one of the ornaments designated as 20 being provided with a hooked end 21 to engage a spring pressed keeper 22 permitting the ornament to be swung to one side upon its pivot 23 to afford access to the valve stem 24. By this construction the spaces between the spokes will be closed so that the general appearance may be varied readily in the process of manufacture, by altering the configuration or color of the members 17 or 19, or both.

The hub 4 may be made as a separate member from the body member 3 as shown in Fig. 2 or may be integral therewith, as shown in Fig. 4. It is evidently very much easier to construct the hub independently of the body portion, and this also has the advantage that the two body members 3 and 5 may be made from the dies or molds, being identical except for the machining of the central openings and the provision of the holes 25 to receive the pins 26 secured in the flange 27 of the hub as means for holding the brake drum 28 from rotation.

The spokes will be dished to suit the type of vehicle with which the wheels are to be used, and the rings 11 and 12 will have an initial diameter equal to the inner diameter of the rim, so that tightening of the nut 8 will first clamp the rings against the rim 2 and further turning of the nut will cause outward radial pressure on the inside of the rim. The radial stress on the spokes will hold the wheel rigid in use. When it is desired to change a tire, the member 5 may readily be removed by loosening the cap 13 and the clamping nut 8, the rim 1 then being free for ready removal and replacement by a similar rim carrying the spare tire.

While the preferred embodiments have been described and illustrated, it will be understood that many variations in form, proportion and details of construction may be made without departing from the principle of the invention or sacrificing any of its advantages. The invention is therefore claimed within the full and legitimate scope of the appended claims.

We claim:—

1. A wheel comprising a rim having an annular rib upon its inner periphery, a hub member, a body member having radial spokes integrally formed therewith, said spokes being connected at their outer ends by a ring adapted to engage one side of the rib and the inner surface of the rim, a second body member having radial spokes, a ring connecting the outer ends of the spokes and adapted to engage the opposite side of the rib from that engaged by the first member, a ring connecting the inner ends of the spokes of each member said rings each having a central opening of a size to permit the passage of the hub member, and a clamping nut having screwthreaded engagement with the hub member and adapted to engage the inner ring of the second member whereby to draw the two spoked members together into clamping engagement with the rib upon the rim.

2. A wheel comprising two dished body portions, each having a series of radial spokes connected at their outer ends by rings, the rings being of substantially equal size, a hub projecting across the median plane of the wheel, the body portions being formed with central portions connecting the spokes, and apertured to permit passage of the hub therethrough, a nut having screwthreaded engagement with the hub and adapted to engage the outer face of the central portion of one body member, and a rim having a rib upon its inner periphery adapted for engagement between the rings forming the outer periphery of the body members whereby rotation of the nut onto the hub in engagement with the central portion of the body member will cause clamping engagement of the rings upon the rim, and radial pressure of the spokes upon the rim.

3. A vehicle wheel comprising a rim having a rib upon its inner periphery, a hub, a dished body portion having a series of spokes extending radially from the hub, and a ring connecting the outer ends of the spokes and adapted for engagement with the rib on the rim, a second oppositely dished body portion having an annular central portion adapted to permit the passage of the hub, a series of spokes extending radially from the central portion and connected at their outer ends by a ring adapted to engage the opposite side of the rib upon the rim from that engaged by the ring of the first body portion, and a clamping nut having screwthreaded engagement with the hub and adapted to engage the outer surface of the central portion of the second dished member to draw the two members together whereby to cause the rings to clamp the rib and to place the spokes under radial compression.

4. A wheel comprising oppositely dished body members, each having a central opening to receive a hub and a series of radially extending tapered spokes connected at their outer ends by a ring, a rim having a rib upon its inner periphery, the rings of the body members engaging opposite sides of the rib and the interior of the rim, and a clamping nut threaded upon the hub and engaging the outer face of the central portion of one of the body members to draw the two members toward the median plane of the wheel into clamping engagement with the rib, the pressure of the nut tending to lessen the angle of the spokes with respect to the median plane of the wheel whereby to cause radial stress upon the rim.

5. A wheel comprising a rim, two dished body members each having a central perforation adapted to receive a hub, a brake drum having perforations in its central portion, one of the body members having correspondingly arranged perforations adapted to register with the perforations in the drum, a hub having a flange provided with pins adapted to enter the perforations in the drum and in the body member, and a clamping nut adapted to engage the hub and a body member to clamp the body members upon the rim and the brake drum upon the wheel.

6. A structure as in claim 1 wherein sheet metal closure members are secured within the spaces between the spokes to form a closed wheel.

7. A structure as in claim 1 wherein the clamping nut is formed with a sleeve extending through the opening in the central portion of the second body member to provide an extended screwthreaded engagement with the hub.

8. A structure as in claim 1 wherein webs are formed within the spaces between the spokes and wherein sheet metal closure members are secured to said webs to form a completely closed wheel.

In testimony whereof we affix our signatures in presence of two witnesses.

HERBERT WALTERS,
ROMAN A. HOERMAN.

Witnesses:
G. L. TERNA,
ARTHUR MINNICK.